United States Patent
Gulkis

(10) Patent No.: US 10,768,903 B2
(45) Date of Patent: *Sep. 8, 2020

(54) VIRTUALIZATION LAYER FOR MOBILE APPLICATIONS

(71) Applicant: Citrix Systems, Inc., Fort Lauderdale, FL (US)

(72) Inventor: Dan Gulkis, Wellington, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,610

(22) Filed: Jan. 25, 2019

(65) Prior Publication Data

US 2019/0155580 A1    May 23, 2019

Related U.S. Application Data

(63) Continuation of application No. 14/755,703, filed on Jun. 30, 2015, now Pat. No. 10,191,723.

(51) Int. Cl.
*G06F 9/44* (2018.01)
*G06F 8/30* (2018.01)
(Continued)

(52) U.S. Cl.
CPC .............. *G06F 8/315* (2013.01); *G06F 9/445* (2013.01); *G06F 9/44521* (2013.01); *G06F 9/45504* (2013.01); *G06F 9/45525* (2013.01)

(58) Field of Classification Search
CPC ...... G06F 8/315; G06F 9/445; G06F 9/44504; G06F 9/44521; G06F 9/44525
See application file for complete search history.

(56) References Cited

U.S. PATENT DOCUMENTS

2004/0006765 A1* 1/2004 Goldman ................ G06F 8/315
717/116
2006/0101395 A1 5/2006 Lopez et al.
(Continued)

OTHER PUBLICATIONS

Lixin Su and Mikko H. Lipasti, Dynamic Class Hierarchy Mutation, IEEE, 2006, retrieved online on Apr. 29, 2020, pp. 1-11. Retrieved from the Internet: <URL: https://ieeexplore.ieee.org/stamp/stamp.jsp?tp=&arnumber=1611533>. (Year: 2006).*

(Continued)

*Primary Examiner* — Hanh Thi-Minh Bui
(74) *Attorney, Agent, or Firm* — Banner & Witcoff, Ltd.

(57) ABSTRACT

Methods, systems, and computer-readable media for providing a virtualization layer for mobile applications are presented. A computing device may parse code of an application to identify a first set of one or more classes in the application. The computing device may transmit code usable by the first set of one or more classes to a module accessible to the application and create a second set of one or more classes in the application to replace the first set of one or more classes, wherein the second set of one or more classes does not inherit from the first set of one or more classes in an object hierarchy. In some embodiments, the second set of one or more classes provides at least one different function from the first set of one or more classes. The computing device may execute the application comprising the second set of one or more classes.

20 Claims, 9 Drawing Sheets

(51) Int. Cl.
*G06F 9/445* (2018.01)
*G06F 9/455* (2018.01)

(56) References Cited

U.S. PATENT DOCUMENTS

| | | |
|---|---|---|
| 2009/0031285 A1 | 1/2009 | Agrawal |
| 2012/0005460 A1 | 1/2012 | Inoue |
| 2013/0254262 A1 | 9/2013 | Udall |
| 2014/0109072 A1 | 4/2014 | Lang et al. |
| 2014/0181803 A1 | 6/2014 | Cooper et al. |
| 2014/0344792 A1 | 11/2014 | Matov et al. |
| 2015/0089474 A1 | 3/2015 | Jain |
| 2016/0210130 A1 | 7/2016 | Sankaranarasimhan et al. |

OTHER PUBLICATIONS

Oct. 6, 2016—(WO) International Search Report and Written Opinion—App No. PCT/US2016/039811.

Lixi Wang et al., Application-aware Cross-layer Virtual Machine Resource Management, ACM, 2012, retrieved online on Aug. 27, 2018, pp. 13-22. Retrieved from the Internet: URL: http://delivery.acm.org/10.1145/2380000/2371541/p 13-wang.pdf?. (Year 2012).

\* cited by examiner

VIRTUALIZATION LAYER FOR MOBILE APPLICATIONS

CROSS-REFERENCE TO RELATED APPLICATION

This application is a continuation of U.S. patent application Ser. No. 14/755,703, filed on Jun. 30, 2015, and entitled "Virtualization Layer for Mobile Applications," hereby incorporated by reference in its entirety.

BACKGROUND

Aspects described herein generally relate to computer hardware and computer software, including software applications for mobile devices and other computing devices. In particular, one or more aspects of the disclosure are directed to computer software for providing a virtualization layer for applications on mobile devices.

Mobile devices, such as smart phones, personal digital assistants, tablet computers, and other types of mobile computing devices are useful in personal and business settings. In addition, users of mobile devices may install various mobile software applications suitable for a variety of purposes. Mobile software applications may be developed by different entities and distributed from different sources, such as companies developing mobile business applications for their employees or independent software vendors developing mobile consumer applications for public consumers. In some instances, software applications may be published and distributed through application stores, such as public application stores or non-public enterprise application stores.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to various systems and techniques that provide a virtualization layer for applications on mobile devices. Mobile applications may be installed on devices with different operating systems and may be managed in order to control execution and/or operation of the mobile applications, such as how such applications may be used by different users and/or how such applications may interact with other applications on a computing device. For example, some mobile applications may be managed applications on which a computing device and/or a mobile device management agent running on the computing device may enforce one or more policies. In some instances, mobile applications may be wrapped using application wrapping techniques in order to apply a management layer to a mobile application that controls execution of the mobile application without changing the underlying source code of the mobile application. The management layer may enforce policies for selectively enabling and disabling specific features of the application in different circumstances, which the management layer may identify and/or otherwise determine based on device state information indicating the current operating state of the computing device. Examples of the features that may be selectively enabled and/or disabled by the management layer include user authentication features, data storage features, file sharing features, and other features of the mobile application.

Some application wrapping methods may be inefficient because the management layer may have a strong dependency on a target application and/or operating system of a mobile device. For example, the target application may include one or more classes, and each class may have a particular lifecycle that is controlled by the operating system of the mobile device. A lifecycle may include a series of methods that are called upon by the operating system of the mobile device when a user navigates through the one or more classes in the target application.

In some application wrapping methods, a management layer might not be able to control the lifecycle of the one or more classes in an application because the operating system may implement methods within the lifecycle. Thus, the operating system may ultimately control the management layer which in turn limits the different policies, restrictions, and access controls that are enforced in the mobile application. In accordance with various aspects of the disclosure discussed in greater detail below, additional control over a mobile application may be provided by controlling and/or managing the lifecycle of the application running on a mobile device. This additional control may allow an application to be managed with respect to each lifecycle of the one or more classes in the application.

To overcome limitations in the prior art, and to overcome other limitations that will be apparent upon reading and understanding the present specification, aspects described herein describe techniques for a virtualization layer, including methods and systems for providing a virtualization layer for mobile applications on devices.

One or more aspects of the disclosure describe a method that may include parsing, by a computing device, code of an application to identify a first set of one or more classes in the application. The method may also include transmitting, by the computing device, code usable by the first set of one or more classes in the application to a module accessible to the application; creating, by the computing device, a second set of one or more classes in the application to replace the first set of one or more classes, wherein the second set of one or more classes does not inherit from the first set of one or more classes in an object hierarchy, and wherein the second set of one or more classes provides at least one different function from the first set of one or more classes; and executing, by the computing device, the application comprising the second set of one or more classes.

In some embodiments, the first set of one or more classes in the application may comprise at least one of activities, services, broadcast receivers, or content providers. In some embodiments, the second set of one or more classes may comprise the same names as the respective names of the first set of one or more classes in the application. Additionally or alternatively, the second set of one or more classes may comprise different code from the code usable by the first set of one or more classes in the application.

In some embodiments, the second set of one or more classes may provide one or more methods that modify the functionality of the application and define preferences upon execution of the application. When the application is executed, the second set of one or more classes may also be executed, and the application may respond to function calls or events from an operating system of the computing device. In some embodiments, the second set of one or more classes may provide at least one different function such as restrictions on the application based on one or more policies.

In some embodiments, the module accessible to the application may comprise an executable file that is executable on demand. For example, the module may comprise a Dalvik Executable file with a .dex extension. Additionally or alternatively, the module may comprise code that links to the second set of one or more classes in the application upon execution of the application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
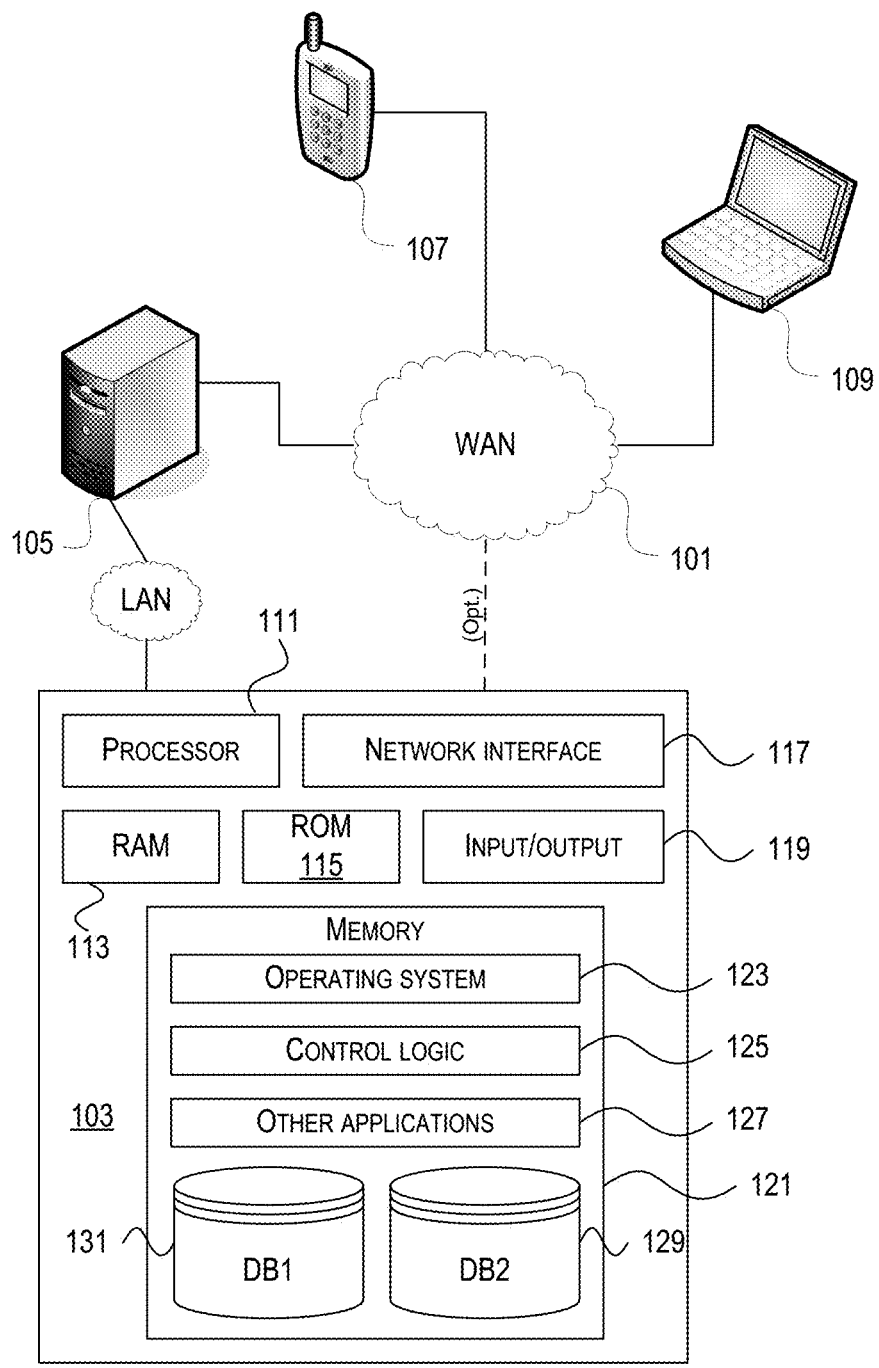
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a general introduction to the subject matter described in more detail below, aspects described herein are directed towards providing a virtualization layer for applications on mobile devices. A mobile application may include a first set of one or more classes in the code of the application, and an operating system running the application on a mobile device may call the one or more classes. The one or more classes may include application components, such as activities, services, broadcast receivers, or content providers. The present disclosure discusses methods, systems, and computer-readable media for wrapping the mobile application by introducing a second set of one or more classes in the mobile application. For example, application code may be parsed to identify the first set of one or more classes in the application. The second set of one or more classes may be created in the application in order to replace the first set of one or more classes. The code usable by the first set of one or more classes in the application may be transmitted to a module accessible to the application. In some instances, "transmitted" may mean that the code is copied from the first set of one or more classes and sent or transferred to the module accessible to the application. In other instances, "transmitted" may mean that the code is copied and/or deleted from the first set of one or more classes, and the copied code may then be sent or transferred to the module accessible to the application. In other instances, "transmitted" may mean that one or more classes are transformed statically via a wrapping procedure.

After the code usable by the first set of one or more classes has been transmitted to the module, the second set of one or more classes may replace the first set of one or more classes in the application. In addition, the second set of one or more classes might not inherit from the first set of one or more classes in an object hierarchy. That is, the one or more classes in the second set might not be or include subclasses of the one or more classes in the first set. The second set of one or more classes may also provide at least one different function from the first set of one or more classes. For example, the second set of one or more classes may provide a virtualization layer that may modify the behavior of the application, such as by enforcing one or more policies and/or restrictions on operation and/or execution of the application. For example, a mobile application may include one or more processes or functionality that allows a user to access confidential information on his or her mobile device. If the user is idle on his or her mobile device, the application may timeout and display a lock screen on a user interface of the mobile device. However, the one or more processes may still be running on the application, which may result in the exchange of confidential information in the background while the mobile device is locked. In some examples, the second set of one or more classes may provide a virtualization layer that may define and apply one or more methods to suspend or destroy the application while the lock screen is being displayed in order to prevent the exchange of confidential information in the background.

By creating a second set of one or more classes in the application, the operating system may call the second set of one or more classes when executing the application on the mobile device. That is, the operating system may no longer call the first set of one or more classes when executing the application on the mobile device. The operating system may instead call the second set of one or more classes which acts as a proxy to the module including the code that was previously usable by the first set of one or more classes in the application. By calling the second set of classes, the operating system may indirectly run the code that was previously usable by the first set of one or more classes without having to interact directly with the code from the first set of one or more classes in the application. Furthermore, the second set of one or more classes may include one or more methods that modify the functionality of the application and control the lifecycle of events or processes in the application. As a result, according to some aspects, an application may be better managed by controlling the lifecycle of the second set of one or more classes through the virtualization layer created in the application.

Methods and systems supporting one or more of these features are described in further detail below. Before discussing these concepts in greater detail, however, several examples of computing devices and system architectures that may be used in implementing and/or otherwise providing various aspects of the disclosure will first be discussed with respect to FIGS. 1-4.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
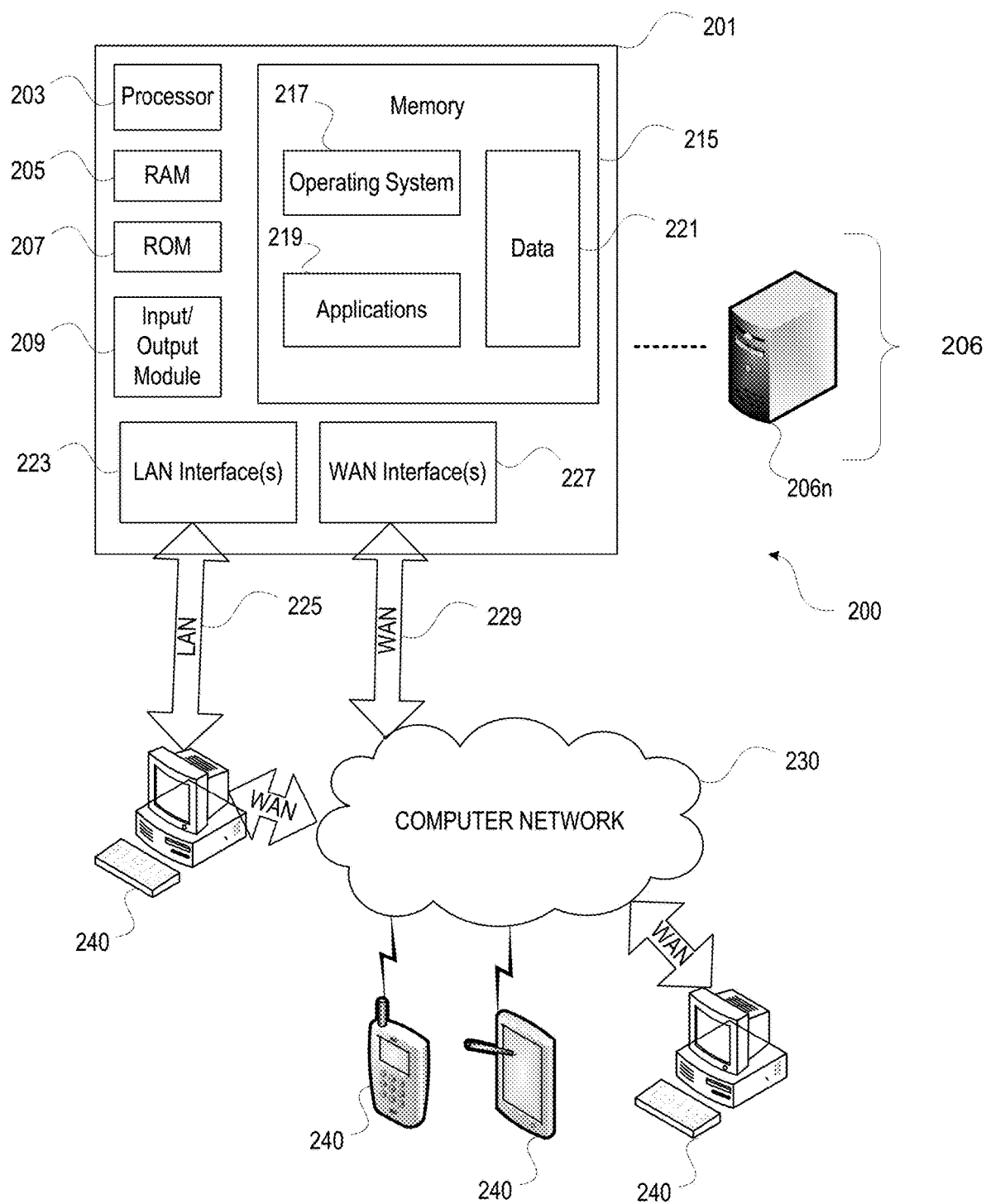
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
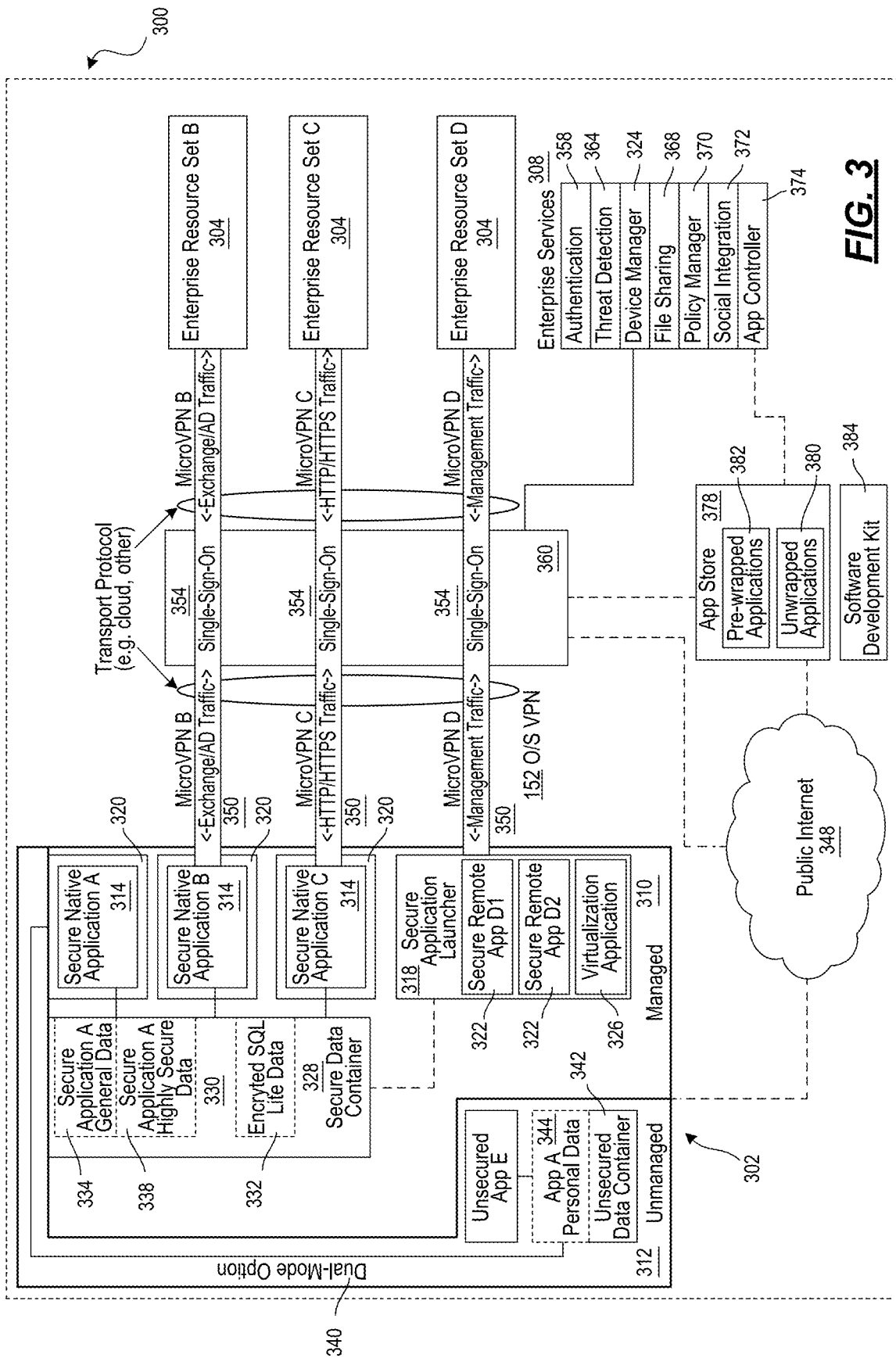
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 548 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, Hyper-Text Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
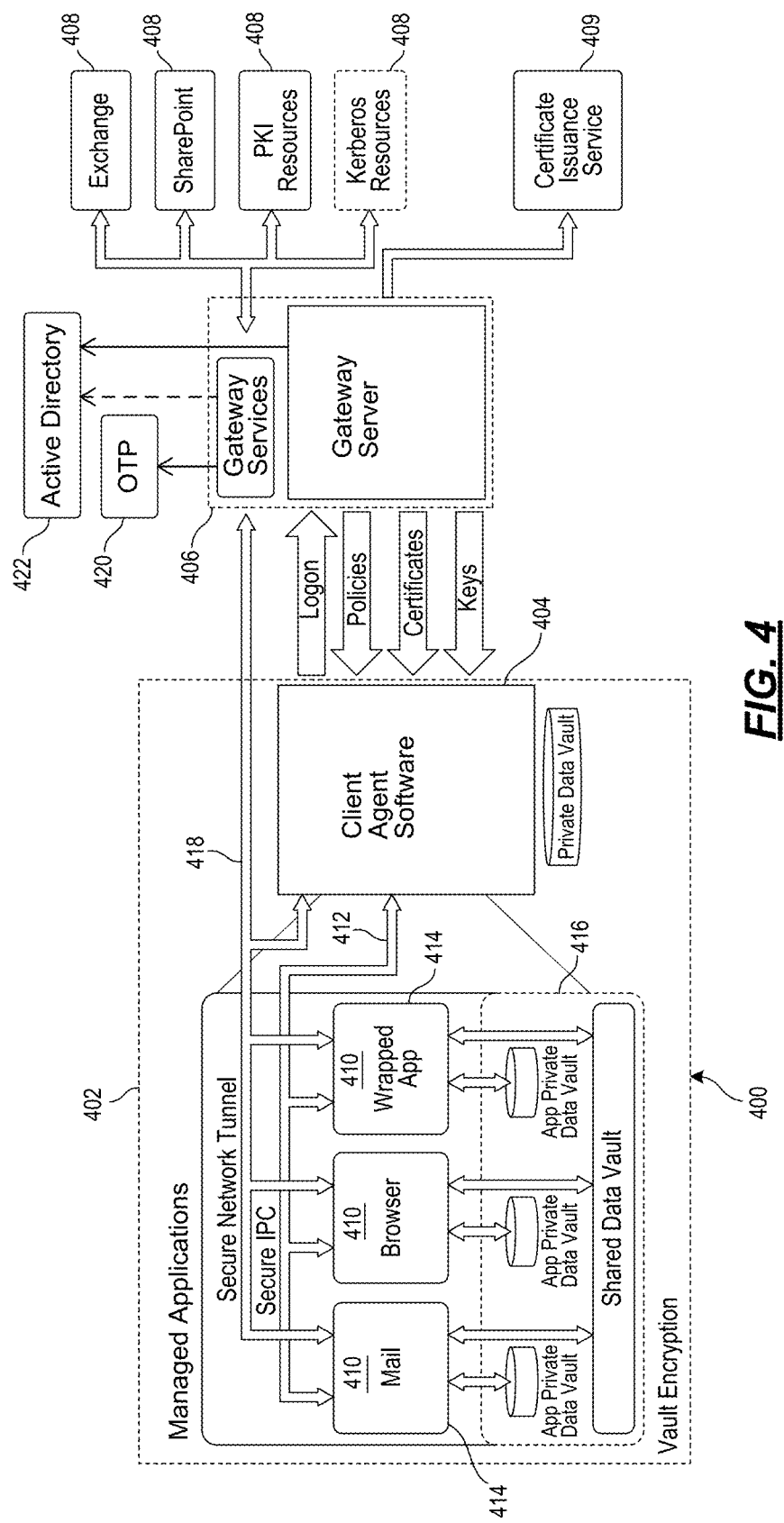
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 400 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature in which gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, in which all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, in which application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, in which after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, in which a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Having discussed several examples of computing architectures and the enterprise mobility management architecture that may be used in providing and/or implementing various aspects of the disclosure, a number of embodiments will now be discussed in greater detail. In particular, and as introduced above, some aspects of the disclosure generally relate to a virtualization layer for mobile applications. The present disclosure teaches creating a new set of one or more classes in a mobile application to function as a virtualization layer for the mobile application. The new set of one or more classes may replace an original set of one or more classes with the purpose of managing the application. That is, the new set of one or more classes may include code that introduces new or different functions from the original set of one or more classes in order to apply additional policies and/or restrictions to the application. The new set of one or more classes may act as a container for a module that includes code usable by the original set of one or more classes. Thus, when an operating system runs the application on a mobile device, the operating system may launch the new set of one or more classes in the application, and the new set of one or more classes may redirect the application to the module with the code from the original set of one or more classes. Therefore, the operating system might not directly control the module including the code from the original set of one or more classes because of the virtualization layer for the application. In other words, the virtualization layer provided by the new set of one or more classes in the application may control the module and also may abstract one or more new methods from the operating system in order to modify the behavior of the application. By launching the new set of one or more classes in the application, the operating system may indirectly run the code from the original set of one or more classes without having to directly interact with the code from the original set of one or more classes and/or without otherwise being aware of the one or more classes. The new set of one or more classes in the virtualization layer may allow management of the application's functionality. In the discussion below, various examples illustrating how a virtualization layer for mobile applications may be implemented and used in accordance with one or more embodiments will be provided.

FIGS. 5-9 illustrate various examples of features, methods, and systems of activities in mobile applications in accordance with one or more features described herein. The features and methods described below in reference to FIGS. 5-9 may be performed by a computing device or a combination of devices, such as the various computing devices and systems shown in FIGS. 1-4. The features, steps, and methods described below in reference to FIGS. 5-9 may be performed in any order, and one or more features, steps, or methods may be omitted and/or added. One or more aspects illustrated in FIGS. 5-9 relate to object hierarchy, application wrapping, and a virtualization layer for mobile applications on mobile devices. For example, applications on the mobile device 302 or 402, such as applications from the application store 378 or managed applications 410, may be wrapped using the techniques disclosed herein for creating a virtualization layer.

Figure 5:
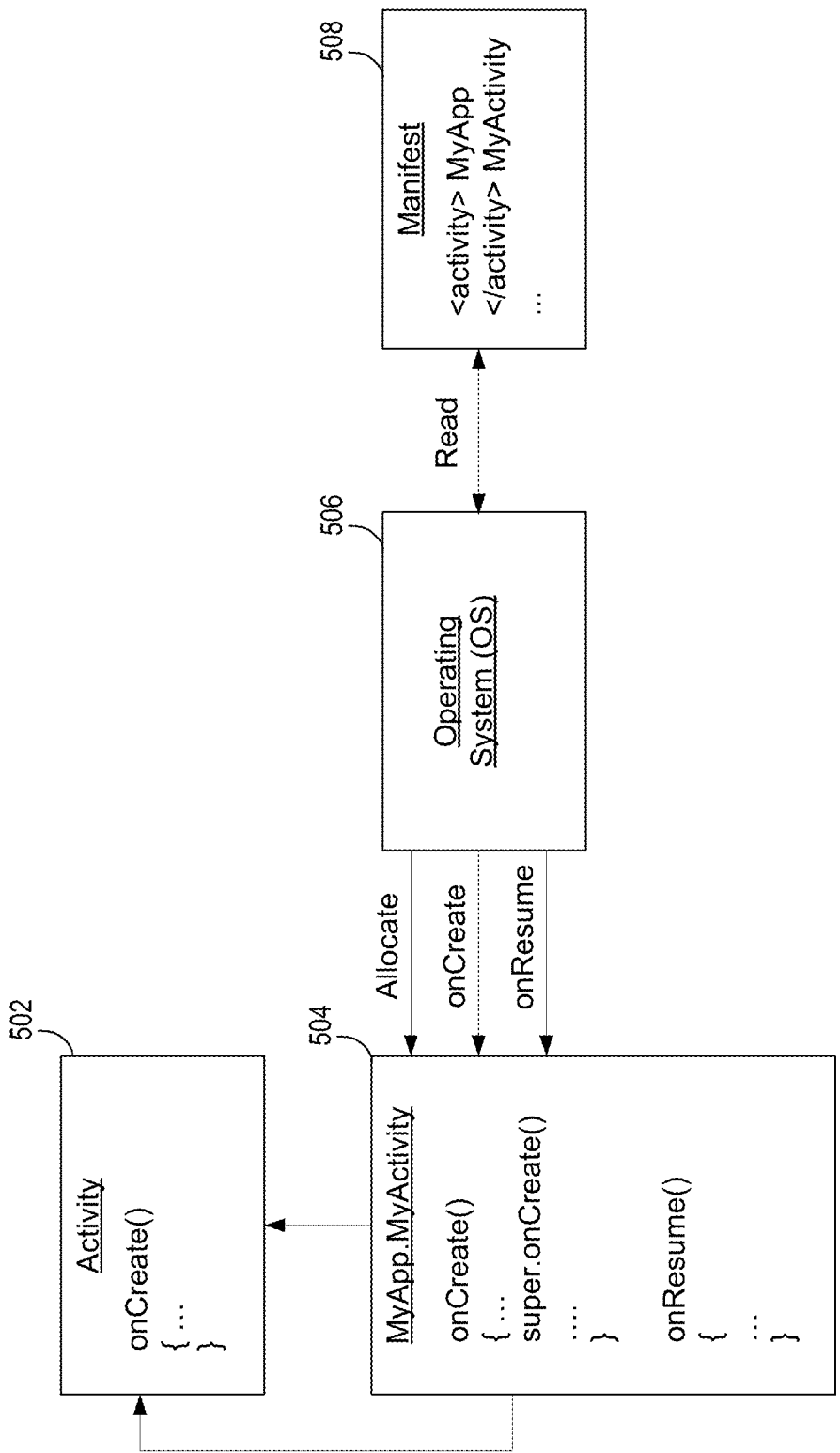
FIG. 5 depicts a diagram of object hierarchy in a mobile application in accordance with one or more features described herein.

In particular, FIG. 5 includes an illustrative diagram of object hierarchy in a mobile application. The diagram in FIG. 5 illustrates an activity 502, MyApp.MyActivity 504, an operating system (OS) 506, and a manifest 508. The activity 502 is an example of a base class provided by the operating system 506 for user activities. User activities may be included in the one or more classes and/or other objects that may make up an application and/or otherwise represent components of the application. The one or more classes may include activities, services, broadcast receivers, and content providers. Activities may include application components that provide different screens in an application to a user. Each activity may be configured to generate and/or otherwise provide a single screen for a user interface of an application, and each activity may be independent of other activities of the application. Services may include application components that run in the background of the application. For example, services may perform work for remote processes or long-running operations in the application, such as retrieving data. Content providers may include application components that manage and provide a shared set of application data. For example, content providers may store data (e.g., a user's contact information) in a location accessible to the application. Broadcast receivers may include application components that receive and respond to system-wide broadcast announcements, such as events or intents. The one or more classes in an application may include any of the aforementioned activities, services, broadcast receivers, and content providers.

For illustrative purposes, activity 502 may represent a class of the one or more classes in the application for examples described herein. In some embodiments, an application may consist of multiple activities, and one activity may be specified as the main activity that is presented to a user when initially launching the application. Each activity may start another activity in order to perform different actions in the application. When a new activity is started, the computing device executing the application and/or the operating system of the computing device may pause a previous activity and may preserve the previous activity in a stack of activities. The computing device and/or the operating system may notify the previous activity of this change through callback methods that correspond to specific stages of the activity's lifecycle.

In some embodiments, one or more classes, referred to as subclasses, may be derived from another class called a superclass. A superclass may also be referred to as a base class or a parent class. Object hierarchy may allow subclasses to inherit commonly used states and behaviors from superclasses. Subclasses may thus inherit all fields and methods from a superclass. In an embodiment, there may be any number of subclasses derived from a superclass. MyApp.MyActivity 504 may represent a subclass of activity 502 that inherits all of the methods of activity 502. MyApp.MyActivity 504 may include code that represents the mobile application.

The operating system 506 may execute the one or more classes in the application. In some embodiments, the operating system 506 may be an Android operating system, an iOS operating system, or the like. The operating system 506 may also include a run-time framework and/or software framework. For example, the operating system 506 may be executing in an Android framework in a Java virtual machine. In some cases, activity 502 may be a part of the run-time framework. For example, activity 502 may represent base classes of a Java or a run-time framework. In some embodiments, the operating system 506 may employ a Dalvik virtual machine to execute the application. The operating system 506 may control the one or more classes in the application, such as activity 502 and MyApp.MyActivity 504.

Furthermore, the application's manifest 508 may define the one or more classes and present information regarding the application to the operating system 506 before the operating system 508 runs the application's code. The manifest 508 may be stored in a root directory and may include application components, such as the one or more classes and other device features for the application. For example, MyApp.MyActivity 504 may be defined as an activity within the manifest 508 using the following syntax: <activity> MyApp.MyActivity </activity>. In some embodiments, the manifest 508 may be stored as an HTML file, XML file, or another file type.

Each class in the application may include one or more methods (e.g., callback methods) that correspond to specific states of a lifecycle of the class. The lifecycle may include a series of methods that are called upon by the operating system 506 when a user navigates through the class in the application. For example, there may be a sequence of callback methods that start up an activity and a sequence of callback methods that tear down or finish the activity. Example methods may include onCreate( ), onStart( ), onPause( ), onResume( ), onDestroy( ), and the like. Each method may correspond to a different state of the class's lifecycle. For example, the operating system 506 may call the onCreate( ) method when MyApp.MyActivity 504 is first initialized or launched, and the operating system 506 may subsequently call the onStart( ) method. The operating system 506 may call the onPause( ) method when the user leaves MyApp.MyActivity 504 and navigates to another activity screen, whereas the operating system 506 may call the onResume ( ) method when the user returns to MyApp.MyActivity 504. The operating system 506 may finally call the onDestroy( ) method before MyApp.MyActivity 504 is finished or destroyed.

As illustrated in FIG. 5, activity 502 may include the onCreate( ) method as well as any number of other methods. MyApp.MyActivity 504 may also include any number of methods that are called upon by the operating system 506. Upon launch of the application, the operating system 506 may allocate an object for the MyApp.MyActivity 504, and the object may include the same fields and methods of the parent object due to inheritance in an object hierarchy. In this example, MyApp.MyActivity 504 may be a subclass that is derived from or extends the superclass activity 502 and inherits fields and methods from the superclass or parent class activity 502. The onCreate( ) method in MyApp.MyActivity 504 may allow MyApp.MyActivity 504 to run its own code and implement its own methods other than the methods of the parent class activity 502. For example, the onCreate( ) method in the MyApp.MyActivity 504 may allow the class to override methods and variables defined in the parent class activity 502. MyApp.MyActivity 504 may also include a super.onCreate( ) method to call the parent class activity 502 (e.g., the superclass). When a subclass includes a method with the syntax "super", the subclass is calling the method of its immediate superclass. In this case, activity 502 may be the immediate superclass of MyApp.MyActivity 504.

In some embodiments, there may be two classes, including a parent class (e.g., activity 502) and a child class (e.g., MyApp.MyActivity 504), and the operating system 506 may identify the instantiated object which is the child class. The operating system 506 may identify the instantiated object and may call one or more methods in the one object (e.g., MyApp.MyActivity 504). When the operating system 506 calls the onCreate( ) method in the object, the operating system 506 may cause invocation of the onCreate( ) method defined in MyApp.MyActivity 504. The onCreate( ) method in MyApp.MyActivity 504 may explicitly invoke the super.onCreate( ) method in MyApp.MyActivity 504 so that the onCreate( ) method in activity 502 may also be executed (e.g., by the operating system 506). The call from the super.onCreate( ) method in MyApp.MyActivity 504 to the onCreate( ) method in activity 502 may be an unenforced requirement. If not, the behavior may be undefined. In some cases, this call might not necessarily be true for all methods, but may be true for life cycle methods. In other embodiments, MyApp.MyActivity 504 might not define the onCreate( ) method. In such cases, the onCreate( ) method in activity 502 may be invoked due to inheritance rules.

Thus, the super.onCreate( ) method may allow the operating system 506 to run the code in MyApp.MyActivity 504 in addition to the code of the parent class (e.g., the onCreate( ) method of activity 502). Therefore, after the call to the superclass, the operating system 506 may call the onCreate( ) method of activity 502, which in return may invoke the functionality of the parent class. The parent class activity 502 may contain code for performing a number of operations in order for the application to function properly. For example, these operations may include managing the lifecycle of one or more classes, optimizing memory usage, and the like. Without the call to the superclass in MyApp.MyActivity 504, the operating system 506 might not execute the code in the parent class activity 502. Therefore, the call to the parent class activity 502 (e.g., invoked by the super.onCreate( ) method) may ensure that these operations may still be performed in the application.

The diagram in FIG. 5 illustrates an unmanaged mobile application without a management layer or application wrapping. Conventional application wrapping may be applied to a mobile application, as illustrated in the example shown in FIG. 6. For example, in some instances, an enterprise organization may secure a particular mobile device used by a particular enterprise user and/or a particular software application (which may, e.g., be executed by such a mobile device) by wrapping the software application with an application wrapper. Such an application wrapper may, for example, provide a policy enforcement layer that may exist between the software application and an operating system of the mobile device (e.g., so as to provide a sandbox in which the software application may be executed) and that may intercept input to the application, output from the application, and/or function calls made by the application to modify and/or otherwise alter the typical and/or default manner in which the application may be executed. In particular, the application wrapper may enforce one or more policies (which may, e.g., be defined in one or more policy files) on the application that may be set by the organization seeking to secure the mobile device and/or the particular application. The policies may, for example, prevent specific features of the application from being used when the mobile device and/or the application is in one or more specific states (e.g., if the device is in a restricted location, if the device is connected to an unsecured network, if one or more other specific programs are open and/or running on the device, etc.). Thus, in enforcing such policies, the application wrapper may selectively enable and/or selectively disable one or more specific features of the application based on device state information (which may, e.g., be monitored by the application wrapper and/or by a mobile device management agent which may be installed on the device and which may communicate with the application wrapper). By securing a mobile device and/or a particular mobile device application with an application wrapper, an organization may, for instance, be able to control how the application is executed by a plurality of different mobile devices that are used by a plurality of different enterprise users (who may, e.g., be employees of the organization and/or otherwise associated with the organization).

Figure 6:
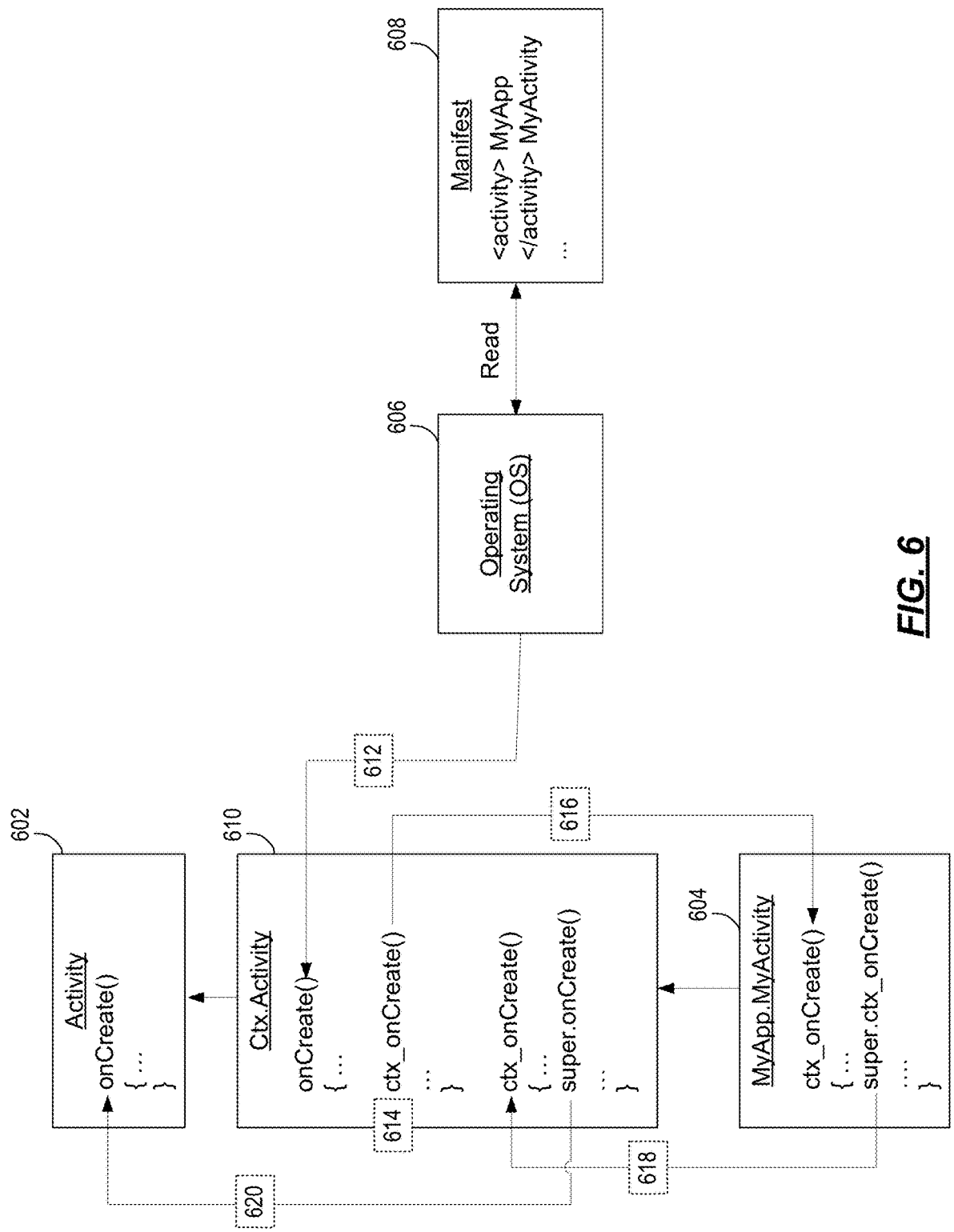
FIG. 6 depicts a diagram of conventional wrapping of a mobile application in accordance with one or more features described herein.

FIG. 6 illustrates an example of conventional wrapping of a mobile application. The diagram in FIG. 6 illustrates an activity 602, MyApp.MyActivity 604, an operating system (OS) 606, a manifest 608, and Ctx.Activity 610. In some embodiments, activity 602, MyApp.MyActivity 604, operating system 606, and manifest 608 may be the same as or similar to activity 502, MyApp.MyActivity 504, operating system 506, and manifest 508, respectively. In addition to the components illustrated in the example shown in FIG. 5, the example shown in FIG. 6 includes a new class Ctx.Activity 610. Ctx.Activity 610 may be a class that is introduced into the object hierarchy as a superclass between activity 602 and MyApp.MyActivity 604. Instead of MyApp.MyActivity 604 inheriting directly from activity 602, MyApp.MyActivity 604 may inherit from Ctx.Activity 610, and Ctx.Activity 610 may inherit from activity 602. The onCreate( ) and super.onCreate( ) methods shown in MyApp.MyActivity 504 may be replaced by ctx_onCreate( ) and super.ctx_onCreate( ) methods, respectively, in MyApp.MyActivity 604. Ctx.Activity 610 may include an onCreate( ) method and ctx_onCreate( ) methods.

FIG. 6 further illustrates a flow of events in steps 612-620 which may occur when running the application code. At step 612, the operating system 606 may initially call, using a thread executed by a processor of a computing device, the onCreate( ) method in Ctx.Activity 610 due to inheritance rules as discussed above with respect to FIG. 5. In some cases, the operating system 506 might not take any special action or might not identify that the operating system is calling the onCreate( ) method in Ctx.Activity 610. By adding the new class Ctx.Activity 610 in between activity 602 and MyApp.MyActivity 604, the code in Ctx.Activity 610 may implement new methods and fields that are inherited by MyApp.MyActivity 604 in order to control the mobile application. For example, there may be additional code added to Ctx.Activity 610 after the initial onCreate( ) method. After this additional code is run, at step 614, the processor of the computing device may continue to execute the thread which may call the ctx_onCreate( ) method in Ctx.Activity 610. Due to inheritance, the invocation of the ctx_onCreate( ) method in Ctx.Activity 610 may call the ctx_onCreate( ) method in MyApp.MyActivity 604 at step 616. The ctx_onCreate( ) method in MyApp.MyActivity 604 may call the immediate superclass Ctx.Activity 610 with the super.ctx_onCreate( ) method. At step 618, the ctx_onCreate( ) method in Ctx.Activity 610 may be called after the call to the superclass in MyApp.MyActivity 604 (e.g., the super.ctx_onCreate( ) method). The ctx_onCreate( ) method in Ctx.Activity 610 may include a super.onCreate( ) method to call the immediate superclass activity 602. Thus, at step 620, the flow may continue to activity 602 which may include additional methods that are called upon by the thread executed by the processor. In some cases, the calls to the additional methods may be internal and may be happening within the class hierarchy. For example, each of these calls might not be directly invoked by the operating system code. Rather, the thread executed by the processor may run or call the additional methods in the class. In other embodiments, MyApp.MyActivity 604 might not have the ctx_onCreate( ) method defined in the class. If MyApp.MyActivity 604 does not have this method defined, then the call to ctx_onCreate( ) in Ctx.Activity 610 might not proceed to MyApp.MyActivity 604 as illustrated by step 616. Instead, the processor executing the thread may continue to run the code in Ctx.Activity 610.

By adding the new class Ctx.Activity 610, the application may ultimately be wrapped with additional policies and/or restrictions in order to secure and manage the application. However, the aforementioned methods and techniques for conventional application wrapping may be limited. For example, when the operating system 606 launches an application, the operating system 606 may allocate or instantiate an object for the MyApp.MyActivity 604 class. Thus, the operating system 606 may load the MyApp.MyActivity 604 (e.g., into memory of the computing device executing the application) in order for the operating system 606 to be able to allocate the object for the class. In some cases, once the application is loaded and executed, the operating system 606 may proceed through the flow of steps 612-620 without being able to defer or skip any of the steps. For example, when the onCreate( ) method in Ctx.Activity 610 is initially called at step 612, the thread executed by the processor may subsequently proceed to call the ctx_onCreate( ) method in step 614 without being able to skip a certain method or end the flow of events necessitated by the activity. Furthermore, once the initial method has been called in step 612, the flow of events may proceed to execute within a predetermined amount of time. If the processor is unable to execute the flow of events within the predetermined amount of time, the application running on the mobile device may become unresponsive.

When running an application, it may be beneficial to be able to defer an event or step for various reasons by implementing a virtualization layer in the application. In some embodiments, an application on a mobile device may have specific functionality that may need to be deferred. For example, the application may include a service that runs in the background, and a user may enter authentication information (e.g., a password, passcode, PIN number, etc.) before the service is allowed to continue running. However, the service might not display any screen or information on the user interface of the mobile device in order to notify the user to enter the authentication information. Thus, the service may automatically start when the mobile device is turned on, and the screen on the user interface notifying to the user to enter the authentication information might not be displayed until the user has launched the application. In other words, there may be an indefinite amount of time before the user is prompted to enter the authentication information that is desired before the service runs or continues to run in the background. Conventional application wrapping methods may prevent this control of the timing of events in an application. Therefore, it may be advantageous to implement a virtualization layer and manage an application in a manner that allows control over the timing of events and steps initiated by callback methods in one or more classes in the application operating on a mobile device.

Disclosed herein are methods, systems, and computer-readable media for managing a mobile application by introducing a virtualization layer in the application. A virtualization layer in a mobile application may provide certain advantages as described herein, such as control over the timing of events and steps initiated by methods in the one or more classes in an application. The virtualization layer may also provide the benefit of instantiating code from different locations, such as being able to download user code on-demand.

Figure 7:
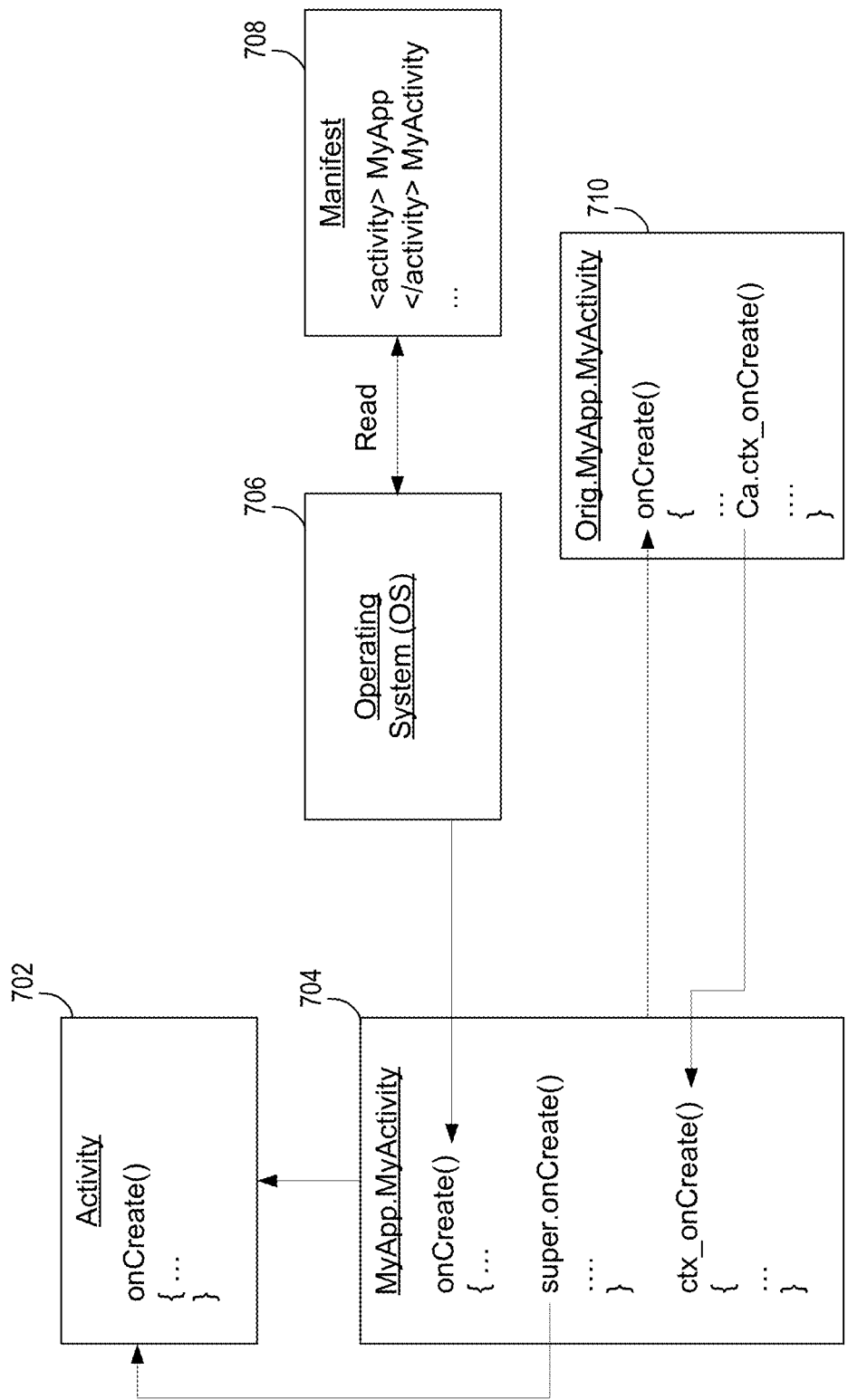
FIG. 7 depicts a diagram of a virtualization layer for wrapping a mobile application in accordance with one or more features described herein.

FIG. 7 is an illustrative diagram of a virtualization layer for wrapping a mobile application in accordance with one or more features described herein. The diagram in FIG. 7 illustrates an activity 702, MyApp.MyActivity 704, an operating system (OS) 706, a manifest 708, and Orig.MyApp.MyActivity 710. In some embodiments, activity 702, MyApp.MyActivity 704, operating system 706, and manifest 708 may be the same as or similar to activity 502, 602, MyApp.MyActivity 504, 604, operating system 506, 606, and manifest 508, 608, respectively. FIG. 7 additionally includes a new component Orig.MyApp.MyActivity 710. Orig.MyApp.MyActivity 710 may be a module that includes code accessible to the mobile application associated with the operating system 706 and activities 702 and 704 of FIG. 7. In some embodiments, the code in Orig.MyApp.MyActivity 710 may include code from MyApp.MyActivity 504. For example, a computing device (e.g., device 103, computing device 201, mobile device 302, etc.) may parse application code, such as code in an application software package and/or stored in a Dalvik Executable file (.dex file), in order to identify a first set of one or more classes in the application. The computing device may identify MyApp.MyActivity 504 and transmit the code usable by MyApp.MyActivity 504 to the module 710. The computing device may copy and/or delete code from MyApp.MyActivity 504 and then transmit or transfer the copied code to the module 710. Orig.MyApp.MyActivity 710 may represent the module to which the code was transmitted.

After transmitting the code to the module 710, the computing device may then create a new class MyApp.MyActivity 704, and the new class may have a different name or the same name as the previous class (e.g., MyApp.MyActivity 504). In some embodiments, by allowing the new class to have the same name as the previous class, other applications on the computing device may also be able to employ the new class without necessitating changes to the code of the other applications. For example, the new class in the application with the same name as the previous class may continue to receive calls and events from the operating system and other applications just as before. That is, the new class in the application may inherit from the same classes that the previous class inherited from. In some embodiments, the transformation of the previous class to the new class (e.g., transformation from MyApp.MyActivity 504 to MyApp.MyActivity 704) may result in the previous class to no longer inherit from the previous class's original parents. The new class MyApp.MyActivity 704 may inherit from activity 702 and act as a container for the Orig.MyApp.MyActivity 710 module. MyApp.MyActivity 704 may also be able to dynamically load the code in Orig.MyApp.MyActivity 710 into the application. That is, Orig.MyApp.MyActivity 710 may no longer inherit from activity 702 as the module 710 represents application code that may be executed on demand Thus, upon launch of the application, the operating system 706 may allocate an object for the new MyApp.MyActivity 704, and the new MyApp.MyActivity 704 may call the methods defined in the module Orig.MyApp.MyActivity 710 when needed or as desired. In other words, the operating system 706 might not load Orig.MyApp.MyActivity 710 upon launch of the application by the operating system 706. However, the operating system 706 may still be able to implement all of the methods defined in Orig.MyApp.MyActivity 710 (e.g., the original activity code) without the actual application code being present within the object hierarchy of the application. The operating system may instead load the new MyApp.MyActivity 704 upon launch, and the new class 704 may load the code in Orig.MyApp.MyActivity 710 as desired in order to implement the defined methods in the module. The new MyApp.MyActivity 704 may thus provide a virtualization layer that may modify the behavior of the application, such as by enforcing one or more policies and/or restrictions on the operation and/or execution of the application.

Furthermore, the new MyApp.MyActivity 704 may include one or more methods and additional code in order to apply/enforce new policies and provide further control over the application. In some embodiments, the new MyApp.MyActivity 704 may provide one or more methods that modify the functionality of the application and/or define preferences upon execution of the application. For example, the application may include a service that runs in the background, in which a user may be prompted to enter authentication information before the service is allowed to continue running. However, with conventional application wrapping, the service may automatically start when the mobile device is turned on, and the service might not display any screen or information on the user interface of the mobile device in order to notify the user to enter the authentication information until the application has been launched. By implementing a new MyApp.MyService class (e.g., which may be similar to MyApp.MyActivity 704), the code in the new class (e.g., which may be implemented by a thread that is executed by a processor of a computing device, such as a mobile device) may prevent the service from starting automatically when the mobile device is turned on. That is, the executable code from the original service class may be transmitted to an Orig.MyApp.MyService module (e.g., which may be similar to Orig.MyApp.MyActivity 710 module). From a perspective of the operating system 706, the service may have started because of the MyApp.MyService class which is being executed. However, from the application's point of view, the service might not have started. In some cases, MyApp.MyActivity may begin and may collect user credentials prior to starting the service. That is, the code in MyApp.MyService may allow the user to enter the authentication information in a user interface screen that is displayed before the service is started. Thus, the methods in the new MyApp.MyService may launch one or more user interface screens at different times during execution of the application. In this way, the virtualization layer provided by MyApp.MyService may allow the order and/or timing of various function calls made by the application to be modified. By replacing the original class (e.g., MyApp.MyActivity 504) with the new class (e.g., MyApp.MyActivity 704), the application may be executed with additional restrictions and policies in place.

In some embodiments, the methods in the new MyApp.MyActivity 704 may result in a change in behavior of the application. For example, an application may be running on a mobile device, and the application may timeout due to a period of inactivity. The user interface may display a lock screen requesting for credentials or authentication information to access the application. If conventional wrapping techniques are used, the operating system may display the lock screen on top and hide the application underneath while the application may still be running. However, by implementing the disclosed virtualization layer in the application, the new MyApp.MyActivity may call methods in Orig.MyApp.MyActivity 710, such as onStop( ) and onDestroy( ), and these methods may suspend and/or destroy the application while the lock screen is displayed on the user interface. The methods onRestar( ), onStart, and onResume( ) may then be employed to restart and reload the application after the user has entered the credentials or authentication information on the lock screen. Thus, the operating system might not be aware of the suspend-resume cycle in the application as implemented by methods in the new MyApp.MyActivity 704. In other words, the virtualization layer may allow the application to be aware of the suspend-resume cycle and other implemented methods, whereas the operating system may remain unaware. The virtualization layer may handle the suspend-resume cycle for the application (e.g., in which one or methods may be called by a thread executed by a processor) while abstracting the suspend-resume cycle from the operating system. In some cases, the operating system might not control the lifecycle of the one or more classes in the application. Instead, the virtualization layer may allow control over the application by controlling and/or managing the lifecycle of the one or more classes in the application By way of further example, the mobile application may, in some instances, be a document viewer application that allows users to access documents on their mobile devices. The document viewer application may include multiple classes, such as activities (e.g., different screens in the application) for viewing a list of documents, accessing document contents, and the like. The document viewer may allow a user to access remotely stored files and documents that include confidential, privileged information in a secure manner on his or her mobile device. In some embodiments, the disclosed virtualization layer may be employed in the document viewer application for policy enforcement purposes. The virtualization layer in the application may apply a policy, such as a geo-fence, in order to prevent users from utilizing the document viewer application on mobile devices outside of predefined locations, such as home, work, and other locations. Users might not be able to access files on the document viewer application unless they are using their mobile devices in the predefined locations. In another embodiment, a geo-fence may prevent users from utilizing the document viewer application outside of a predefined network. For instance, users may be permitted to use the document viewer application when they are on accessing the application through a predefined network, such a corporate network designed for use at work. The virtualization layer in the application may additionally apply other restrictions to modify the functionality of the document viewer application. For example, the document viewer application may timeout due to a user being idle and display a lock screen on a user interface of the mobile device associated with the user. A new class (e.g., MyApp.MyActivity 704) in the virtualization layer may define and apply one or more methods to suspend or destroy the application while the lock screen is being displayed. The one or more methods in the new class may enhance security of the document viewer application by preventing confidential, privileged information from being exchanged in the background while the mobile device is locked.

Furthermore, the virtualization layer may allow encryption of files along with additional security within an application. For example, upon launch of a conventionally wrapped document viewer application, the operating system may access a shared preferences file in order to obtain credentials to log onto a network. However, with the disclosed virtualization layer, methods in the new MyApp.MyActivity 704 may allow the operating system to display a user authentication screen requesting for credentials or authentication information prior to accessing the shared preferences file. For example, with the disclosed virtualization layer, the operating system might not have access to the shared preferences file before launch of the document viewer application because the shared preferences file may be encrypted. Furthermore, the operating system may present a user authentication screen to receive credentials from the user in order to decrypt and access the encrypted shared preferences file. This authentication may increase security of the application by allowing a user to log in to a network associated with an enterprise and access confidential information after authentication and launch of the document viewer application.

Figure 8:
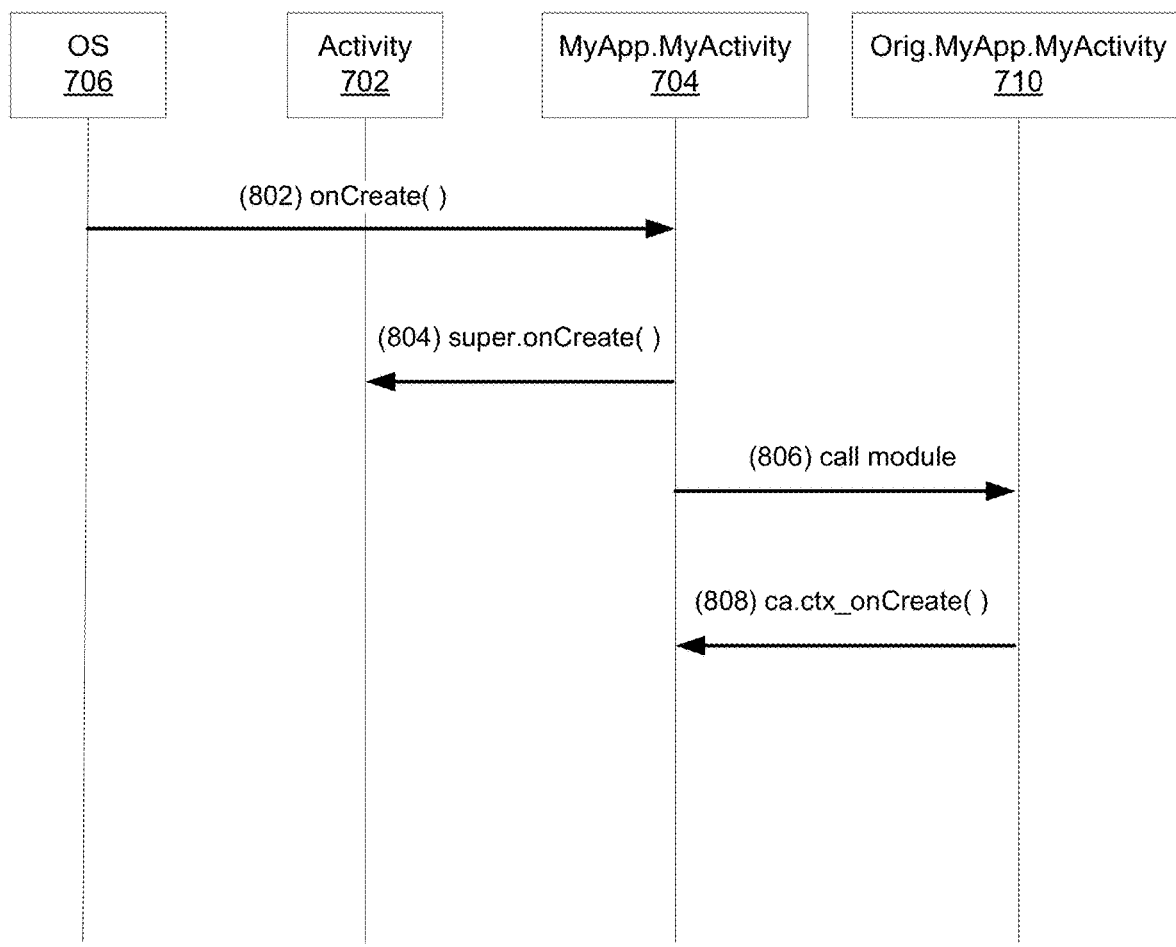
FIG. 8 depicts an illustrative flow diagram depicting an example process of executing a mobile application with a virtualization layer in accordance with one or more features described herein.

FIG. 8 is an illustrative flow diagram depicting an example process of executing a mobile application with a virtualization layer in accordance with one or more features described herein. FIG. 8 illustrates a flow of events in steps 802-808 which may occur when running the application code with the virtualization layer. In some embodiments, the flow of events of FIG. 8 may be implemented in an application running on a computing device with a processor. At step 802, the operating system (e.g., operating system 706) may initially call the onCreate( ) method in MyApp.MyActivity 704. MyApp.MyActivity 704 may represent the new class created to replace the previous class (e.g., MyApp.MyActivity 504). At step 804, the processor of the computing device may continue to execute a thread that was initiated by the onCreate( ) method at step 802 by executing the super.onCreate( ) method. The invocation of the super.onCreate( ) method may call the onCreate( ) method in the Activity class (e.g., Activity 702). After this call, the new MyApp.MyActivity 704 may call the Orig.MyApp.MyActivity 710 module at any time (e.g., at step 806). In some cases, MyApp.MyActivity 704 may call the onCreate( ) method in Orig.MyApp.MyActivity 710 module after the super.onCreate( ) method returns (e.g., after the thread, executed by the processor, calls the super.onCreate( ) method). Additionally or alternatively, the MyApp.MyActivity 704 may allow the onCreate( ) method in Activity 702 and/or subsequent calls to be completed before calling the Orig.MyApp.MyActivity 710 module.

For example, after completion of the onCreate( ) method in Activity 702 and/or subsequent calls, the computing device may display a screen requesting a user to enter a PIN number. After the user has entered a PIN number, the thread may call a method (e.g., a validatePIN( ) method) in MyApp.MyActivity 704 in order to validate the PIN number. After validating the PIN number, the thread may subsequently call the onCreate( ) method in Orig.MyApp.MyActivity 710 module (e.g., at step 806). In other words, the new MyApp.MyActivity 704 may include a pointer or redirect to the Orig.MyApp.MyActivity 710 module that includes the code executable by the previous class. Orig.MyApp.MyActivity 710 may include any number of methods and functions that may be executed. In some embodiments, the code in Orig.MyApp.MyActivity 710 may be streamed and/or dynamically loaded during execution of the application. Orig.MyApp.MyActivity 710 may further include a pointer to call back to methods or functions defined in a base activity class, such as subclass MyApp.MyActivity 704. For example, the method "ca.ctx_onCreate( )" may point back to MyApp.MyActivity 704 at step 808. The operating system may execute methods in MyApp.MyActivity 704 which may result in different functionality or modified behavior of the application. For example, the methods in MyApp.MyActivity 704 may define and enforce new policies and restrictions, such as adding user interface screens, changing the timing of lock screens on a mobile device, adding authentication screens, encrypting files, geo-fencing, and the like.

Figure 9:
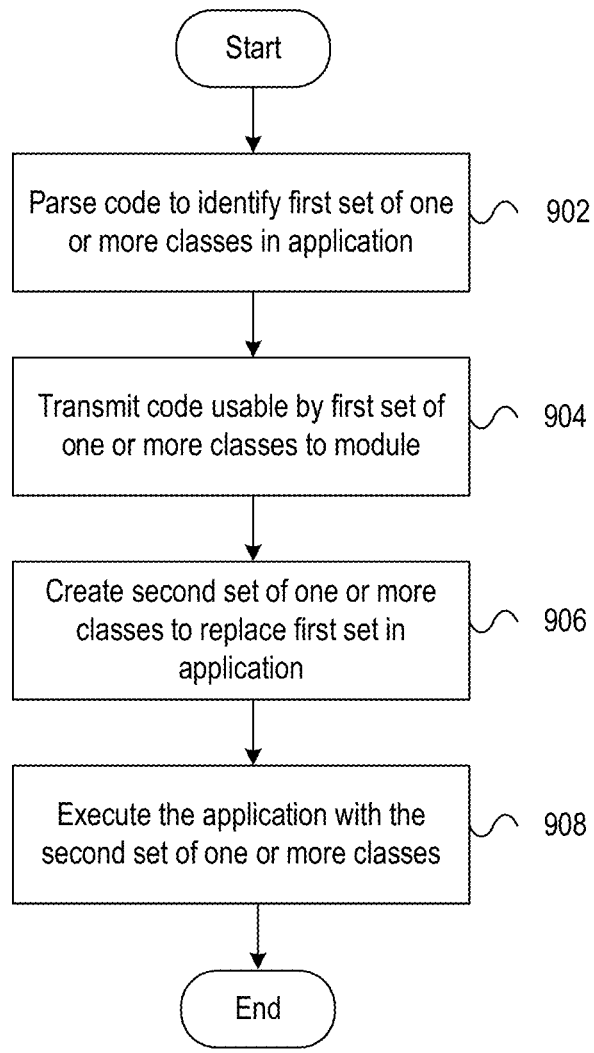
FIG. 9 depicts an illustrative flow diagram depicting an example process of creating a new set of one or more classes to function in a virtualization layer for a mobile application in accordance with one or more features described herein.

FIG. 9 is an illustrative flow diagram depicting an example process of creating a new set of one or more classes to function in a virtualization layer for a mobile application in accordance with one or more features described herein. In one or more embodiments, the method illustrated in FIG. 9 and/or one or more steps thereof may be performed by a computing device (e.g., device 103, computing device 201, mobile device 302, etc.). In other embodiments, the process illustrated in FIG. 9 and/or one or more steps thereof may be embodied in computer-executable instructions that are stored in a computer-readable medium, such as a non-transitory computer-readable memory.

As illustrated in FIG. 9, the method may begin at step 902 in which code of an application may be parsed to identify a first set of one or more classes in the application. For example, a computing device may analyze application code, such as code that is part of an application software package, in order to determine the first set of one or more classes in the application. In some embodiments, the first set of one or more classes may be defined in a manifest (e.g., manifest 508, 608, 708) associated with the application. At step 904, code usable by the first set of one or more classes in the application may be transmitted to a module accessible to the application. For example, a computing device may copy code from a first set of one or more classes (e.g., MyApp.MyActivity 504) and transmit or transfer the copied code to a module accessible to the application (e.g., Orig.MyApp.MyActivity 710). In some cases, the code may be copied and/or deleted from the first set of one or more classes.

At step 906, a second set of one or more classes in the application may be created in order to replace the first set of one or more classes in the application. For example, the computing device may create a second set of one or more new classes in the application (e.g., MyApp.MyActivity 704) in order to replace the first set of one or more classes (e.g., MyApp.MyActivity 504). In some embodiments, there may be multiple new classes created, such as MyApp.MySecondActivity, MyApp.MyThirdActivity, and so forth, and each new class may be added as corresponding subclasses and/or superclasses within the application. Each of the one or more classes in the second set may also point or redirect an operating system (e.g., upon execution of the application) to the module accessible to the application and dynamically load the code usable by the first set of one or more classes in the application. In another embodiment, each of the one or more classes in the second set may have the same name as the respective name of each of the one or more classes in the first set.

At step 908, the application including the second set of one or more classes may be executed. For example, an operating system (e.g., operating system 706) of a computing device may execute the application including the second set of one or more classes (e.g., MyApp.MyActivity 704). In some embodiments, executing the second set of one or more classes may result in different functionality or restrictions on the application based on one or more enforced policies.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
parsing, by a computing device, code of an application to identify a first set of one or more classes in the application;
transmitting, by the computing device, code usable by the first set of one or more classes in the application to a module accessible to the application;
creating, by the computing device, a second set of one or more classes in the application to replace the first set of one or more classes, wherein the second set of one or more classes does not inherit from the first set of one or more classes in an object hierarchy, and wherein the second set of one or more classes modifies at least one method from the first set of one or more classes to change a functionality of the application;
wrapping the application to enforce one or more policies on operation of the application; and
executing, by the computing device, the application comprising the second set of one or more classes.

2. The method of claim 1, wherein the first set of one or more classes comprises at least one of activities, services, broadcast receivers, or content providers.

3. The method of claim 1, wherein the second set of one or more classes comprises same names as respective names of the first set of one or more classes in the application.

4. The method of claim 1, wherein the second set of one or more classes comprises different code from the code usable by the first set of one or more classes in the application.

5. The method of claim 1, wherein the second set of one or more classes modifies the at least one method from the first set of one or more classes to change the functionality of the application by defining preferences upon execution of the application.

6. The method of claim 1, wherein executing the application comprises executing the second set of one or more classes, wherein the application responds to function calls or events from an operating system of the computing device.

7. The method of claim 1, wherein the module comprises an executable file that is executable on demand.

8. The method of claim 1, wherein the module comprises a Dalvik Executable file with a .dex extension.

9. The method of claim 1, wherein the module comprises code that links to the second set of one or more classes in the application upon execution of the application.

10. The method of claim 1, wherein the second set of one or more classes modifies the at least one method from the first set of one or more classes to change the functionality of the application by deferring the at least one method.

11. The method of claim 1, wherein the second set of one or more classes modifies the at least one method from the first set of one or more classes to change the functionality of the application by skipping the at least one method.

12. One or more non-transitory computer-readable media having computer-executable instructions stored thereon that, when executed, cause at least one computing device to:

parse code of an application to identify a first set of one or more classes in the application;

transmit code usable by the first set of one or more classes in the application to a module accessible to the application;

create a second set of one or more classes in the application to replace the first set of one or more classes, wherein the second set of one or more classes does not inherit from the first set of one or more classes in an object hierarchy, and wherein the second set of one or more classes modifies at least one method from the first set of one or more classes to change a functionality of the application;

wrap the application to enforce one or more policies on operation of the application; and execute the application comprising the second set of one or more classes.

13. The one or more non-transitory computer-readable media of claim 12, wherein the first set of one or more classes comprises at least one of activities, services, broadcast receivers, or content providers.

14. The one or more non-transitory computer-readable media of claim 12, wherein the second set of one or more classes comprises same names as respective names of the first set of one or more classes in the application.

15. The one or more non-transitory computer-readable media of claim 12, wherein the second set of one or more classes comprises different code from the code usable by the first set of one or more classes in the application.

16. The one or more non-transitory computer-readable media of claim 12, having additional computer-executable instructions stored thereon that, when executed, further cause the at least one computing device to:

execute the second set of one or more classes, wherein the application responds to function calls or events from an operating system of the at least one computing device.

17. A computing device, comprising:

at least one processor; and memory storing computer-readable instructions that, when executed by the at least one processor, cause the computing device to:

parse code of an application to identify a first set of one or more classes in the application;

transmit code usable by the first set of one or more classes in the application to a module accessible to the application;

create a second set of one or more classes in the application to replace the first set of one or more classes, wherein the second set of one or more classes does not inherit from the first set of one or more classes in an object hierarchy, and wherein the second set of one or more classes modifies at least one method from the first set of one or more classes to change a functionality of the application;

wrap the application to enforce one or more policies on operation of the application; and execute the application comprising the second set of one or more classes.

18. The computing device of claim 17, wherein the first set of one or more classes comprises at least one of activities, services, broadcast receivers, or content providers.

19. The computing device of claim 17, wherein the second set of one or more classes modifies the at least one method from the first set of one or more classes to change the functionality of the application by defining preferences upon execution of the application.

20. The computing device of claim 17, wherein the module comprises code that links to the second set of one or more classes in the application upon execution of the application.

* * * * *